United States Patent [19]
Stockton

[11] Patent Number: 5,184,842
[45] Date of Patent: Feb. 9, 1993

[54] VEHICLE SUSPENSION MECHANISM

[76] Inventor: Jeffrey M. Stockton, 1109 W. Oak, Arkansas City, Kans. 67005

[21] Appl. No.: 748,469

[22] Filed: Aug. 22, 1991

[51] Int. Cl.⁵ .............................................. B60G 11/02
[52] U.S. Cl. ..................................... 280/719; 280/720
[58] Field of Search ............... 280/104, 669, 684, 699, 280/718, 719, 720

[56] References Cited

U.S. PATENT DOCUMENTS

| | | | |
|---|---|---|---|
| 2,992,835 | 7/1961 | Vittone | 280/720 |
| 4,203,615 | 5/1940 | Cislo et al. | 280/689 |
| 3,913,941 | 10/1975 | Guerriero et al. | 280/690 |
| 3,917,306 | 11/1975 | Madler et al. | 280/104 |
| 4,313,618 | 2/1982 | Robinson | 280/688 |
| 4,458,918 | 7/1984 | Rumpel | 280/719 |
| 4,772,042 | 9/1988 | Jinsheng | 280/669 |
| 4,854,606 | 8/1989 | de Gaucourt et al. | 280/699 |
| 4,867,474 | 9/1989 | Smith | 280/699 |

Primary Examiner—Kenneth R. Rice
Attorney, Agent, or Firm—Litman, McMahon & Brown

[57] ABSTRACT

A vehicle suspension system comprises a transversely-disposed elongate spring connected to opposing stub axles, each having one of an opposing pair of wheels rotatably mounted on a distal end thereof such that moments generated in one of the wheels due to external influences or operational conditions are directly transferred to the other wheel, causing the wheels to act in concert. A plurality of modified embodiments provide different exemplary configurations for so transferring such moments.

19 Claims, 2 Drawing Sheets

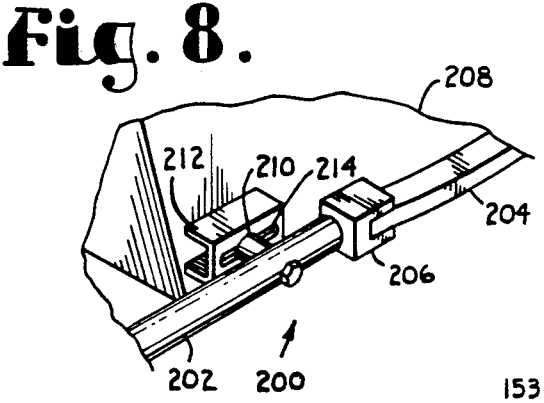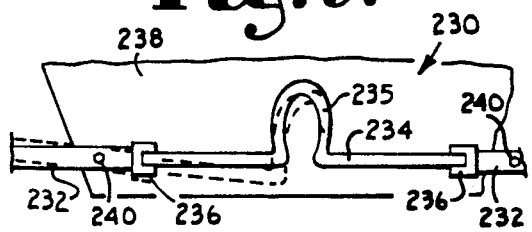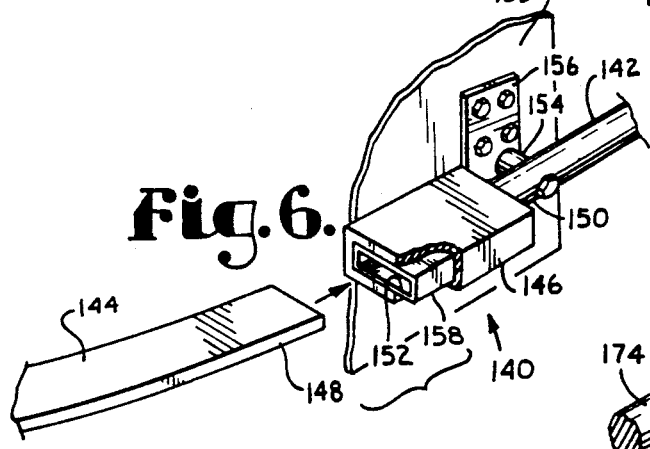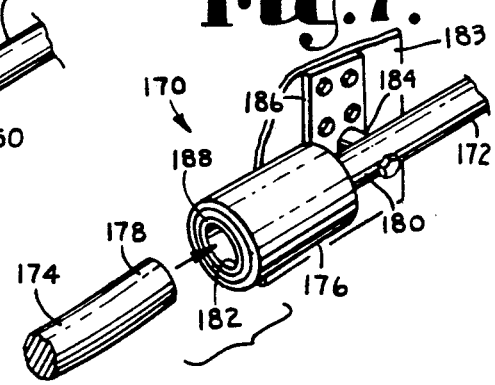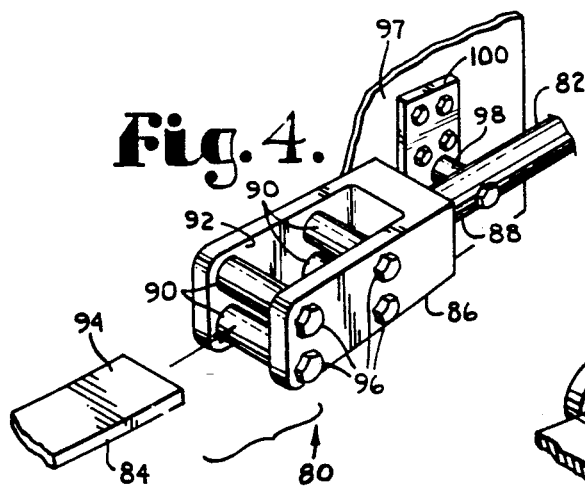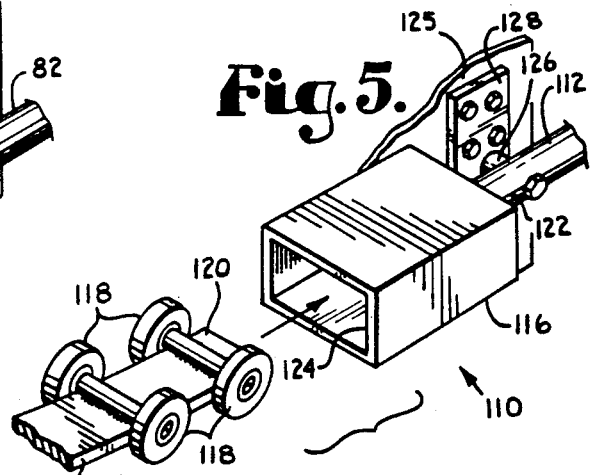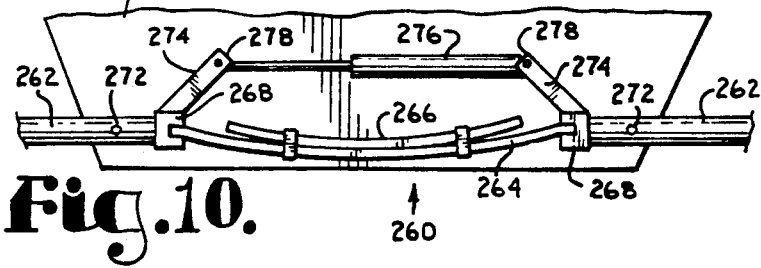

VEHICLE SUSPENSION MECHANISM

BACKGROUND OF THE INVENTION

The present invention relates to a vehicle suspension system and, particularly, to such a vehicle suspension system for substantially reducing the tilt of a moving automobile while being subjected to various road and operational conditions.

Early automobiles had suspension systems which were somewhat similar to those used on wagons and buggies. Such suspension systems were adequate for the speeds and road conditions existing at that time; however, as road conditions improved and speeds increased, suspension systems were gradually improved.

At times, automobile manufacturers have emphasized the ride rather than the cornering abilities of their automobiles. As a result, individual-wheel-type and live axle suspension systems were common in many vehicles.

Independent wheel suspension systems can exaggerate an automobile's tendency to roll or tilt in a cornering situation because the springs on the wheels disposed toward the outside of the curve are depressed to a greater extent than the corresponding springs on the wheels disposed toward the inside of the curve. Similar adverse effects can occur in severe cross-wind conditions. To reduce such adverse effects, stiff suspension systems with limited travel and stiff shock absorbers can be used to minimize such rolling tendency, but they tend to reduce the riding qualities of those vehicles.

To reduce this adverse effect, various suspension systems have been tried and are disclosed in the prior art, such as pneumatic systems, hydraulic systems, spring systems, and various combinations thereof, some controlled by on-board computers. In systems involving transversely disposed springs, however, the prior art generally teaches connecting the spring system to the chassis rather than connecting the transversely disposed spring only to the wheel assemblies, which chassis connection substantially inhibits or prohibits the direct transfer of moments created in one of the wheel assemblies to the other opposing wheel assembly.

What is needed is a suspension system that provides both automatic lean and cornering control for a vehicle whereby a vertical displacement Of a wheel on one side of an vehicle, due to either external influences or operational conditions, causes its opposing wheel to undergo a similar vertical displacement such that both of the wheels act in concert, thereby providing lateral vehicle stability.

SUMMARY OF THE INVENTION

An improved vehicle suspension system is provided for substantially reducing the tendency of a vehicle to tilt laterally while exposed to various external influences and operational conditions. The system includes a pair of laterally disposed stub axles, each having an opposing wheel mounted on a distal end thereof. Each of the stub axles is pivotally connected to the vehicle by a moment pin disposed in a fore-and-aft orientation. A laterally disposed, elongate spring is rigidly connected to an inner end of one of the stub axles and is connected to an inner end of the other one of the stub axles in a manner whereby a moment generated in one of the stub axles about its respective moment pin is directly communicated to the other one of the stub axles, such that both of the wheels act in concert.

Other modified embodiments of a vehicle suspension system, namely the first through the fourth, provide various exemplary configurations for operably compensating for changes in effective length of a transversely disposed elongate spring due to flexure of the spring while both of the moment pins ar fixedly connected to the vehicle.

A fifth modified embodiment of a vehicle suspension system provides for one of the moment pins to be fixedly connected to the vehicle while the other one of the moment pins is slidably displacable toward or away from the fixed moment pin to compensate for flexure of the spring.

A sixth modified embodiment of a vehicle suspension system provides for a spring having a loop to transfer moments from one of the stub axles to the other.

A seventh modified embodiment of a vehicle suspension system provides for an auxiliary spring to assist the normally operational spring as the vehicle is subjected to external influences or operational conditions which create excessively severe moments in one or both of the stub axles. Also, a shock absorber is provided for damping out oscillatory motions.

OBJECTS AND ADVANTAGES OF THE INVENTION

Therefore, the objects and advantages of the present invention include: providing a vehicle suspension system which directly mechanically communicates vertical displacement of a wheel of a vehicle to an opposing wheel of that vehicle such that both of the wheels act in concert: providing such a system which is adaptable to a variety of vehicles having various sizes and types; providing such a system which is adaptable to both front and rear axles; providing such a system which is adaptable to both steerable and non-steerable axles; providing such a system which is sufficiently spaced from an underlying surface such that the system is normally protected from projections of the underlying surface; providing such a system which has a minimal number of parts in order to simplify maintenance and assembly; providing such a system which can be used in conjunction with pneumatic and hydraulic suspension components; providing such a system which can be used in conjunction with shock absorbers; providing such a system which improves handling and cornering control; providing such a system which is dimensioned such that the center of gravity of a vehicle is not raised excessively and, in fact, is lowered in some vehicles; providing such a system which is adapted to distribute a load more evenly between opposing wheels of a vehicle while such vehicle is turning a corner, experiencing severe cross-winds, navigating rough or uneven roads, etc., thus, greatly improving the safety and roadability of the vehicle; and generally providing such a system which operates efficiently and reliably, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a perspective and fragmentary, exploded view of a first modified embodiment of a vehicle suspension system, according to the present invention.

FIG. 5 is a perspective and fragmentary, exploded view of a second modified embodiment of a vehicle suspension system, according to the present invention.

FIG. 6 is a perspective and fragmentary, exploded view of a third modified embodiment of a vehicle suspension system, according to the present invention.

FIG. 7 is a perspective and fragmentary, exploded view of a fourth modified embodiment of a vehicle suspension system, according to the present invention.

FIG. 8 is a perspective and fragmentary view of a fifth modified embodiment of a vehicle suspension system, according to the present invention.

FIG. 9 is a fragmentary, front elevational view of a sixth modified embodiment of a vehicle suspension system, according to the present invention.

FIG. 10 is a fragmentary, front elevational view of a seventh modified embodiment of a vehicle suspension system, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
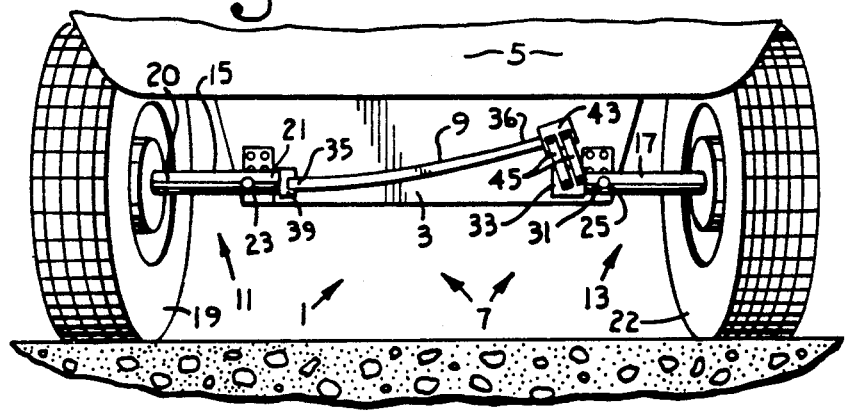
FIG. 1 is a front perspective view of a vehicle suspension system, according to the present invention.
Figure 3:
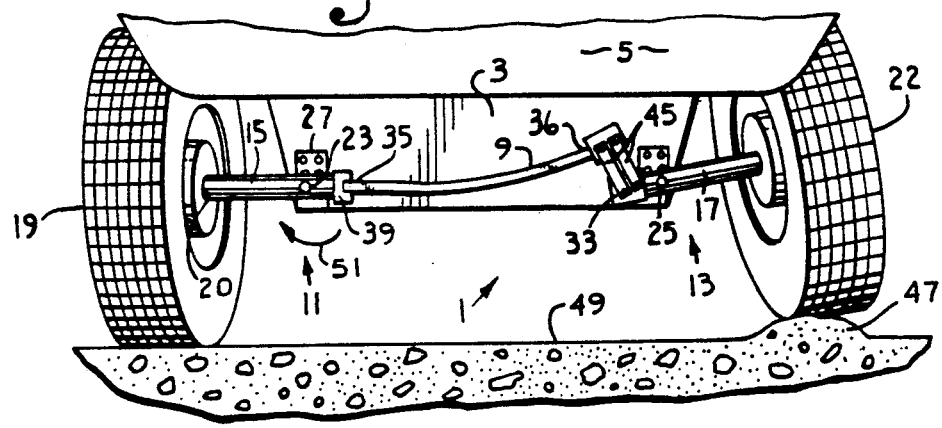
FIG. 3 is a front perspective view of the vehicle suspension system, similar to that shown in FIG. 1, illustrating a wheel of the vehicle being displaced upwardly.
Figure 2:
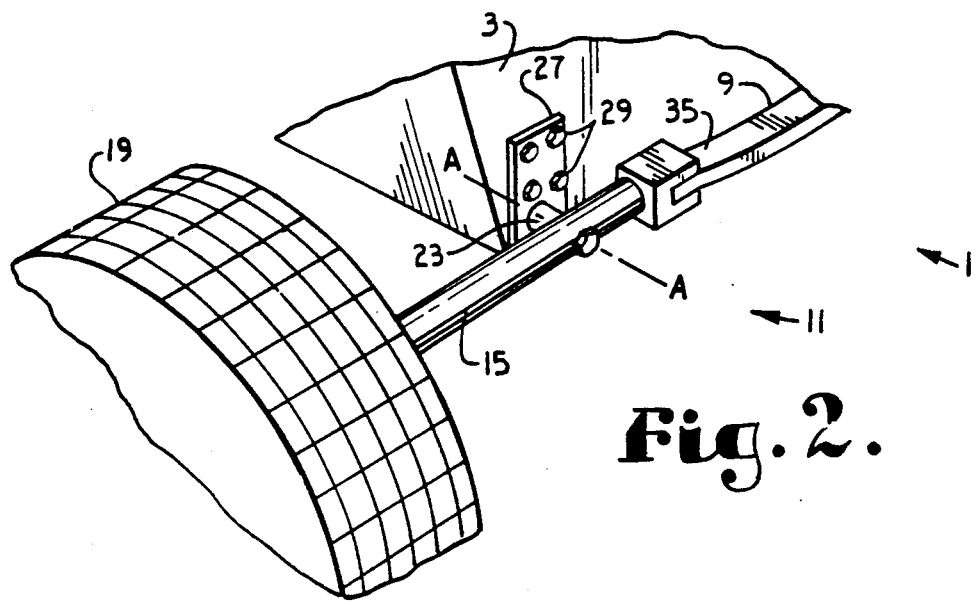
FIG. 2 is an enlarged, fragmentary, side perspective view of the vehicle suspension system.

The reference number 1 generally refers to a vehicle suspension system in accordance with the present invention, as shown in FIGS. 1 to 3. The vehicle suspension system 1 is mounted on a chassis 3 of a vehicle 5 and is comprised of mounting means 7, and moment transfer means, such as a spring 9.

The mounting means 7 generally include a pair of wheel assemblies 11 and 13. Each of the wheel assemblies 11 and 13 includes a stub axle 15 or 17, a wheel 19 or 22, and a moment pin 23 or 25. It is to be understood that the roles of the wheel assemblies 11 and 13, and the elements associated with each, are interchangeable in the following discussions without affecting the intent and purposes of the present invention.

The wheel 19 is pivotally mounted about a distal end 20 of the stub axle 15. It is to be understood that each of the wheel assemblies 11 and 13 could include steering mechanisms for the wheels 19 and 22, pursuant to methods commonly known in the art. However, for purposes of clarity, such steering mechanisms are not included in the drawings.

The moment pin 23 is rigidly connected to the chassis 3, such as by a plate 27 and a plurality of bolts 29, such that the moment pin 23 is generally horizontal and preferably has a fore-and-aft orientation, as illustrated in FIG. 3. The moment pin 23 is adapted such that the stub axle 15 is pivotally connected to the moment pin 23 such that the stub axle 15 preferably rotates thereabout in a generally vertical plane oriented transversely to the vehicle 5 and wherein such connection is intermediate to, and substantially offset from, the distal end 20 and an inner end 21 of the stub axle 15. The pivot axis "A" of the stub axle 15, as illustrated in FIG. 3, is offset from both ends of the stub axle 15 for purposes hereinafter described.

Similarly, the wheel 22 is pivotally mounted about the distal end of the stub axle 17, the moment pin 25 is rigidly connected to the chassis 3 such that the moment pin 25 is preferably parallel to the moment pin 23, and the stub axle 17 is pivotally connected to the moment pin 25. An inner end 31 of the stub axle 17 is generally rigidly connected to an axle bracket 33.

The spring 9 has a first end 35 and a second end 36 and is sufficiently elongate such that the first end 35 is rigidly connected to the inner end 21 of the stub axle 15, such as by an adapter 39, as the second end 36 is rigidly connected to a spring bracket 43, which is spaced in close proximity to the axle bracket 33, as shown in FIG. 1. As so spaced, the spring 9 generally extends transversely to the vehicle 5. The spring 9 may be straight or arcuately shaped, as needed for the requirements of a particular application of the present invention. It is foreseen that the adapter 39 could be constructed integrally with either the stub axle 15 or the spring 9, the spring bracket 43 could be constructed integrally with the spring 9, and the axle bracket 33 could be constructed integrally with the stub axle 17.

Preferably, the moment pins 23 and 25 are spaced relative to their respective stub axles 15 and 17 such that the effective magnitude of the leverage ratio between the wheel 19 and the spring 9 about the moment pin 23 is substantially similar to the magnitude of the corresponding effective leverage ratio between the wheel 22 and the spring 9 about the moment pin 25.

The spring 9 is generally constructed of materials having rugged mechanical characteristics and high elastic strength, such as manganese series spring steel (e.g., 65 Mn or 60 $Si_2Mn$), or other suitable materials. The time rate at which a particular moment is transferred by the spring 9 is dependent upon the spring constant of the spring 9, the required magnitude of such spring constant generally being dependent upon the particular application of the present invention.

It is to be understood that the spring 9 is not limited to a uniform rectangular cross-sectional shape as suggested in FIG. 2 but, instead, can have a variety of different cross-sectional shapes, such as round, oval, square, etc., and may have a developing profile. The cross-sectional area and profile of the spring 9 are determined by the type, construction and loading capacity of the vehicle 5 of a particular application. It is also to be understood that the spring 9 may have solid, composite leaf, or other suitable construction, as required for a particular application of the present invention.

Two opposing pairs of links 45 are pivotally connected to opposite sides of the axle bracket 33 and the spring bracket 43 in a shackle-type arrangement, as shown in FIG. 1, such that each side-by-side pair of the links 45 substantially forms a parallelogram, or other suitable geometrical configuration, with the axle bracket 33 and the spring bracket 43, which hereinafter may sometimes be referred to as an opposing parallelogram arrangement. Such connections between the links 45, the axle bracket 33 and the spring bracket 43 are arranged such that displacements of the axle bracket 33 and the spring bracket 43 are generally coplanar with displacements of the stub axle 17 and the axle bracket 33 as the stub axle 17 pivots about the moment pin 25.

The various components of the suspension system 1 are constructed, assembled and installed such that the stressing of the spring 9 by static moments, generated by the wheels 19 and 22 as a result of the weight of the vehicle 5, resiliently supports the vehicle 5 with the stub axles 15 and 17 generally aligned approximately co-axially with each other when the vehicle 5 carries a typical load.

It is to be understood that the various elements of the present invention as hereinafter described are constructed with sufficient ruggedness to withstand the abusive environment normally experienced by any particular s application thereof. It is to be further understood that the present invention is adaptable to a variety of vehicles having various sizes and types; to either or both front and rear axles; to either or both steerable and non-steerable axles; and in such a manner that the center of gravity of a vehicle is not raised excessively but, in fact, is lowered in some oases, yet leaving sufficient spacing from an underlying surface for normal protection from projections of such underlying surface.

It is to be noted that the present invention has a minimal number of parts and is relatively simple and non-complex, which provides for simplified maintenance and assembly.

Pneumatic and/or hydraulic suspensions and necessary bracketry (not shown), commonly known in the art, may be used in conjunction with the suspension system 1 for load leveling and cushioning purposes. Also, other mechanical spring suspensions may be used in conjunction with the present invention to provide certain cushioning attributes. In addition, shock absorbers and necessary bracketry (not shown), also commonly known in the art, may be used in conjunction with the suspension system 1 for damping purposes.

Unless indicated otherwise, moments described herein as being transferred between the wheel assemblies 11 and 13, s sometimes referred to herein as dynamic moments, are generated by external or operational influences on the vehicle 5 and are in addition to those, sometimes referred to herein as static moments, which are caused by the wheels 19 and 22 bearing against the surface 49 in order to support the weight of the vehicle 5.

Operation of the vehicle 5 may cause one of the wheels, such as the wheel 22, to suffer an impact with a bump 47 in an underlying surface 49, as indicated in FIG. 3. The impact with the bump 47 spontaneously generates a counter-clockwise moment in the stub axle 17 forcing the wheel 22 to undergo a generally vertical, arcuately upward displacement and causing the inner end 31 of the stub axle 17 to pivot vertically arcuate downward about the moment pin 25. Accordingly, the links 45 cause the spring bracket 43 to similarly rotate in order to maintain its orientation relative to the axle bracket 33. In so doing, the counter-clockwise moment of the stub axle 17 is directly communicated to the spring 9, causing a bending moment to be imposed in the spring 9.

The spring 9, in attempting to resist that bending moment, communicates the counter-clockwise moment transferred to it by the stub axle 17 to its only other connection, namely, the inner end 21 of the stub axle 15. As a direct result, the stub axle 15, in turn, is caused to rotate clockwise about the moment pin 23, as indicated by the arrow referenced by the numeral 51 in FIG. 3.

Such rotation of the stub axle 15 continues until the interaction Of the wheel 19 with the underlying surface 49 Creates a moment of sufficient magnitude, over and above the static moment created by the static moment caused by the weight of the vehicle 5, to counter the dynamic moment transferred by the spring 9. Preferably, the magnitude of such rotation of the stub axle 15 about the moment pin 23 is such that the wheel 19 assumes a change in spacing relative to the vehicle 5 approximating the change in spacing of the wheel 22 relative to the vehicle 5 which was caused by the impact with the bump 47. In other words, the spring 9, as connected only between the wheel assemblies 11 and 13, causes the wheels 19 and 22 to act in concert.

Thus, instead of the vehicle 5 abruptly tilting sidewise due to the impact with the bump 47, the vehicle 5 maintains a substantially level orientation, thereby providing greater stability to the vehicle 5. After navigating the bump 47 and the external influence of the bump 47 is no longer present, both of the wheels 19 and 22 are quickly returned to their normal, static positions by the spring 9.

The shackle-type arrangement of the links 45 with the axle bracket 33 and the spring bracket 43 allows the spring 9 to move lengthwise relative to the stub axle 17 to compensate for changes in the effective length of the spring 9 during flexure thereof.

In a similar manner, as the vehicle 5 navigates a curve, centrifugal force causes a greater portion of the load to be distributed to the wheel disposed toward the outside of the curve, which generally causes the vehicle 5 to tilt toward the outside to the curve. Assume, for discussion purposes, that the wheel toward the outside of a particular curve is the wheel 22. As centrifugal force causes a greater load to be placed on the wheel 22, a bending moment is placed on the spring 9, similar to that hereinbefore described for the impact with the bump 47.

As a result, the wheel 19 is correspondingly displaced upwardly in response thereto, preventing raising of the roll center of the vehicle 5 such that a tendency for the vehicle 5 to turn over in a curve is substantially lessened. Thus, the vehicle 5 remains substantially non-tilted by the centrifugal force, providing greater stability and control to the vehicle 5 while navigating the curve.

Interestingly, the faster the vehicle 5 navigates a particular curve, the more the wheels 19 and 22 are displaced upwardly relative to the chassis 3 and, as a result, the lower the center of gravity of the vehicle 5 is positioned, thus providing a natural stability to the vehicle 5 under such circumstances. In addition, traction between the wheel 22 and the underlying surface 49 is retained, thereby providing for increased safety, even as a corner is navigated at an excessively high speed Similarly, cross winds create moments in a stub axle, such as the stub axle 17, that is disposed toward the leeward side of the cross-wind. As hereinbefore described, the spring 9 transfers that moment to the other one of the stub axles, stub axle 15 in this case, such that leaning of the vehicle 5 due to the cross-wind is eliminated, thereby greatly improving directional control and stability of the vehicle 5, even in gusty cross-wind conditions.

In anticipation of eventual failure of the vehicle suspension system 1, stops (not shown), spaced beyond the normal maximum operational range of the stub axles 15 and 17, can be appropriately spaced, as needed, such that the vehicle 5 is caused to be supported and transportable on the wheels 19 and 22 until the system 1 can be repaired.

A first modified vehicle suspension system in accordance with the present invention is shown in FIG. 4 and is generally designated by the reference numeral 80. Many of the characteristics of the first modified vehicle suspension system 80 are substantially similar to those previously described for the vehicle suspension system 1 and will not be reiterated here in detail.

The first modified vehicle suspension system 80 includes a stub axle 82 connected to moment transfer means, such as an elongate spring 84 in cooperation with a U-shaped axle bracket 86. The axle bracket 86 is rigidly connected to a distal end 88 of the stub axle 82 and includes two pair of pin guides 90, preferably cylindrically shaped, which are parallelly spaced apart in a yoke 92 such that a distal end 94 of the spring 84, which generally has a uniform rectangular cross-sectional shape, is snugly and slidably receivable between opposing pairs of the pin guides 90. If s desired for a particular application, the pin guides 90 may be rotatably connected within the yoke 92 by yoke pins 96. The stub axle 82 is pivotally connected to a vehicle chassis 97 by a moment pin 98 and a plate 100. Preferably, each of the pin guides 90 is oriented parallel to the moment pin 98.

As the stub axle 82 and a similar opposing stub axle pivotally connected to the chassis 97 (not shown) react to various external influences and operational conditions as hereinbefore described, moments created thereby cause the spring 84 to be flexed and, as a result, to transfer those moments from one of such stub axles to the other. Concurrently therewith, the spring 84 is slidably displaced endwise relative to the axle bracket 86, as needed, to compensate for changes in effective length of the spring 84 during flexure of the spring 84.

A second modified vehicle suspension system in accordance with the present invention is shown in FIG. 5 and is generally designated by the reference numeral 110. Many of the characteristics of the second modified vehicle suspension system 110 are substantially similar to other embodiments described herein and will not be reiterated here in detail.

The second modified vehicle suspension system 110 includes a stub axle 112 connected to moment transfer means, such as an elongate spring 114 in cooperation with an axle bracket 116. Two pair of transversely oriented roller guides 118 are parallelly spaced apart and rotatably connected to a distal end 120 of the spring 114, as illustrated in FIG. 5. The axle bracket 116 is rigidly connected to a distal end 122 of the stub axle 112 and includes a cavity 124 which is uniformly dimensioned such that the roller guides 118 are snugly and slidably receivable therein. The stub axle 112 is pivotally connected to a vehicle chassis 125 by a moment pin 126 and a plate 128. Preferably, axes of the roller guides 118 are oriented parallel to the moment pin 126.

As the stub axle 112 and a similar opposing stub axle pivotally connected to the chassis 125 (not shown) react to various external influences and operational conditions as hereinbefore described, moments created thereby cause the spring 114 to be flexed and, as a result, to transfer those moments from one of such stub axles to the other. Concurrently therewith, the spring 114 is generally slidably displaced endwise relative to the axle bracket 116, as needed, to compensate for changes in effective length of the spring 114 during flexure of the spring 114.

A third modified vehicle suspension system in accordance with the present invention is shown in FIG. 6 and is generally designated by the reference numeral 140. Many of the characteristics of the second modified vehicle suspension system 140 are substantially similar to other embodiments described herein and will not be reiterated here in detail.

The third modified vehicle suspension system 140 includes a stub axle 142 connected to moment transfer means, such as an elongate spring 144 in cooperation with an axle bracket 146. A distal end 148 of the spring 144 generally has a uniform rectangular cross-sectional shape. The axle bracket 146 is rigidly connected to a distal end 150 of the stub axle 142 and includes a rectangularly shaped cavity 152 which is uniformly dimensioned to snugly and slidably receive the distal end 148 of the spring 144 therein. The stub axle 142 is pivotally connected to a vehicle chassis 153 by a moment pin 154 and a plate 156.

If desired, a removable insert 158, containing the cavity 152, may be frictionally connected within the axle bracket 146, as shown in FIG. 6, such that the insert 158 may be replaced as needed due to wearing thereof caused by movement of the spring 144 relative to the axle bracket 146. The insert 158 may be constructed of porous bronze, or other suitable material, for lubrication purposes if desired.

As the stub axle 142 and a similar opposing stub axle pivotally connected to the chassis 153 (not shown) react to various external influences and operational conditions as hereinbefore described, moments created thereby cause the spring 144 to be flexed and, as a result, to transfer those moments from one of such stub axles to the other. Concurrently therewith, the spring 144 is generally slidably displaced endwise relative to the axle bracket 146, as needed, to compensate for changes in effective length of the spring 144 during flexure of the spring 144.

A fourth modified vehicle suspension system in accordance with the present invention is shown in FIG. 7 and is generally designated by the reference numeral 170. Many of the characteristics of the fourth modified vehicle suspension system 170 are substantially similar to other embodiments described herein and will not be reiterated here in detail.

The fourth modified vehicle suspension system 170 includes a stub axle 172 connected to moment transfer means, such as an elongate spring 174 in cooperation with an axle bracket 176. A distal end 178 of the spring 174 generally o has a uniform circular cross-sectional shape. The axle bracket 176 is rigidly connected to a distal end 180 of the stub axle 172 and includes a circularly shaped cavity 182 therein which is uniformly dimensioned to snugly and slidably receive the distal end 178 of the spring 174. The stub axle 172 is pivotally connected to a vehicle chassis 183 by a moment pin 184 and a plate 186.

If desired, a removable insert 188, containing the cavity 182, may be frictionally connected within the axle bracket 176, as shown in FIG. 7, such that the insert 188 may be replaced as needed due to wearing thereof caused by movement of the spring 174 relative to the axle bracket 176. The insert 188 may be constructed of porous bronze, or other suitable material, for lubrication purposes if desired. Alternatively, the insert 188 may be a sleeve-type ball bearing.

As the stub axle 172 and a similar opposing stub axle pivotally connected to the chassis 183 (not shown) react to various external influences and operational conditions as hereinbefore described, moments created thereby cause the spring 174 to be flexed and, as a result, to transfer those moments from one of such stub axles to the other. Concurrently therewith, the spring 174 is generally slidably displaced endwise relative to the axle bracket 176, as needed, to compensate for changes in effective length of the spring 174 during flexure of the spring 174.

The fourth modified vehicle suspension system is particularly useful for applications which may require some twisting action to occur between the spring 174 and the axle bracket 176.

A fifth modified Vehicle suspension system in accordance With the present invention is shown in FIG. 8 and is generally designated by the reference numeral 200. Many of the characteristics of the fifth modified vehicle suspension system 200 are substantially similar to other embodiments described herein and will not be reiterated here in detail.

The fifth modified vehicle suspension system 200 includes a pair of opposing stub axles 202 (one not shown) connected to moment transfer means, such as an elongate spring 204. Each of the stub axles 202 are rigidly connected to opposite ends of the spring 204, such as by a pair of adapters 206 (one not shown). One of the stub axles 202 (the one not shown) is pivotally connected to a vehicle chassis 208 by one of a pair of moment pins 210, as previously described herein.

The other one of the stub axles 202 (shown in FIG. 8) is slidably and pivotally connected by the other one of the moment pins 210 to a chassis bracket 212, as shown in FIG. 8. The chassis bracket 212 is rigidly connected to the vehicle chassis 208 and has a throughslot 214, which has a longitudinal axis oriented generally colinearly with the moment pins 210 such that one of the moment pins 210 (shown in FIG. 8) is slidably movable toward or away from the other one of the moment pins 210 (not shown), as hereinafter described.

As each of the stub axles 202 is subjected to various external influences and operational conditions, moments created thereby cause the spring 204 to be flexed and, as a result, to transfer those moments to the other one of the stub axles 202. Concurrently therewith, the moment pin 210 (shown in FIG. 8) mounted in the chassis bracket 212 is correspondingly slidably displaced along the slot 214, as needed, to compensate for changes in effective length of the spring 204 during flexure of the spring 204.

A sixth modified vehicle suspension system in accordance with the present invention is shown in FIG. 9 and is generally designated by the reference numeral 230. Many of the characteristics of the sixth modified vehicle suspension system 230 are substantially similar to other embodiments described herein and will not be reiterated here in detail.

The sixth modified vehicle suspension system 230 includes a pair of opposing stub axles 232 connected to moment transfer means, such as an elongate spring 234 having an intermediate loop 235. Each of the stub axles 232 are rigidly connected to opposite ends of the spring 234, such as by an adapter 236. Each of the stub axles 232 is pivotally connected to a vehicle chassis 238 by a moment pin 240 as previously described herein.

As each of the stub axles 232 is subjected to various external influences and operational conditions, moments created thereby cause the spring 234, and particularly the loop 235 thereof, to be flexed and, as a result, to transfer those moments to the other one of the stub axles 232. For some applications where the pins 240 are subjected to excessive lateral stressing by the loop 235, it may be necessary to mount one of the pins 240 in a chassis bracket, similar to the chassis bracket 212 described for another embodiment herein, or other suitable arrangement, to compensate for changes in effective length of the spring 234 during flexure of the spring 234.

The phantom lines in FIG. 9 illustrate the widening of the loop 235 in response to an upper displacement of the leftmost wheel (not shown) just prior to transferring the moment created thereby to the rightmost wheel (not shown).

Alternatively, the spring 234 can be comprised essentially entirely of the loop 235, with the stub axles 232 extending and attaching to the spring 234 in close proximity to the extremities of the loop 235.

A seventh modified vehicle suspension system in accordance with the present invention is shown in FIG. 10 and is generally designated by the reference numeral 260. Many of the characteristics of the seventh modified vehicle suspension system 260 are substantially similar to other embodiments described herein and will not be reiterated here in detail.

The seventh modified vehicle suspension system 260 includes a pair of opposing stub axles 262 connected to moment transfer means, such as an elongate spring 264 having an overload or auxiliary spring 266 connected thereto, with the auxiliary spring 266 generally having an arcuate shape such that the ends thereof are normally displaced from the spring 264, as shown in FIG. 10. Each of the stub axles 262 is rigidly connected to opposite ends of the spring 264, such as by an adapter 268. Each of the stub axles 262 is pivotally connected to a vehicle chassis 270 by a moment pin 272 as previously described herein.

As each of the stub axles 262 is subjected to various external influences and operational conditions, moments created thereby cause the spring 264 to be flexed and, as a result, to transfer those moments to the other one of the stub axles 262. For some applications where the moment pins 272 are subjected to excessive lateral stressing, it may be necessary to mount one of the moment pins 272 in a chassis bracket, similar to the chassis bracket 212 described for another embodiment herein, or other suitable arrangement to compensate for changes in effective length of the spring 264 during flexure of the spring 264.

For external influences and operational conditions which are sufficiently adverse as to cause excessive curvature of the spring 264, the auxiliary spring 266 provides backup assistance to the spring 264, when needed, for transferring the moments generated in one of the stub axles 262 to the other one of the stub axles 262.

In the example shown in FIG. 10, damping means, such as a shock absorber 276 pivotally connected between distal ends 278 of arms 274 rigidly connected to the adapters 268, provide an ability to damp out oscillatory motion of the stub axles 262. Such damping means can similarly be adapted for connection between the inner ends of the stub axles of the other embodiments described herein.

It is to be understood that while certain forms of the present invention have been illustrated and described herein, it is not to be limited to the specific forms or arrangement of parts described and shown.

What is claimed and desired to be secured by Letters Patent is as follows:

1. An axle and suspension system for a vehicle including a pair of wheels and having a direction of travel, which comprises:
   (a) axle means having opposite first and second ends each mounting one of said wheels;
   (b) first and second rotational mounting means for rotatably mounting said axle means on said vehicle at first and second rotational axes, each such rotational axis extending generally parallel to said vehicle direction of travel; and
   (c) spring moment transfer means for transferring a moment with respect to one of said rotational axes such that a similar but counter moment is created with respect to the other one of said rotational axes; said spring moment transfer means connected to said rotational mounting means on sides of said rotational axes opposite the wheels.

2. The invention of claim 1 wherein:
   (a) said spring moment transfer means comprises said axle means having first and second stub axles at said first and second ends respectively; each said stub axle having inner and outer ends with a respective rotational axis positioned therebetween, and leaf spring means having first and second ends rigidly connected to first and second stub axle inner ends respectively.

3. An axle and suspension system for a vehicle including a pair of wheels and having a direction of travel, which comprises:
   (a) axle means having opposite first and second ends each mounting one of said wheels;
   (b) first and second rotational mounting means for rotatably mounting said axle on said vehicle at first and second rotational axes; each such rotataional axis extending generally parallel to said vehicle direction of travel; and
   (c) spring moment transfer means intermediate said first and second rotational mounting means for transferring a moment with respect to one of said rotational axes such that a similar but counter moment is created with respect to the other one of said rotational axes; said spring moment transfer means comprises said axle means having first and second stub axles at said first and second ends respectively; each said stub axle having inner and outer ends with a respective rotational axis positioned therebetween, and spring means having first and second ends connected in moment-transfer relationship to first and second stub axle inner ends respectively.

4. The suspension system according to claim 3, including:
   (a) a shock absorber.

5. A suspension system for a vehicle, comprising:
   (a) a pair of opposing wheels;
   (b) mounting means for separately mounting each one of said pair of wheels to said vehicle; moment transfer means for directly causing each one of said pair of wheels to maintain a spacing relative to said vehicle similar to that of the other one of said pair of wheels such that said pair of wheels act in concert; said moment transfer means connected only to said mounting means;
   (c) a moment pin for each one of said pair of wheels; each said moment pin connected to said vehicle in a generally horizontal, fore-and-aft orientation;
   (d) a stub axle for each one of said pair of wheels; each said stub axle pivotally connected to a different one of said moment pins wherein such connection is intermediate to, and substantially offset from, each end of said stub axle;
   (e) each one of the stub axles is connected to its respective said moment pin such that the magnitude of a leverage ratio provided between one of said wheels and said moment transfer means is substantially equivalent to the magnitude of a similar leverage ratio between the other one of said wheels and said moment transfer means;
   (f) a chassis bracket to said vehicle; said chassis bracket having a slot spaced generally colinearally with said moment pins; and wherein
   (g) one of said moment pins is slidably connected to said slot.

6. The suspension system according to claim 5, wherein:
   (a) said moment transfer means is a spring.

7. The suspension system according to claim 6, wherein:
   (a) said spring is a composite leaf spring.

8. The suspension system according to claim 6, including:
   (a) an auxiliary spring.

9. The suspension system according to claim 6, including:
   (a) an adapter connected to a first end of said spring and to an inner end of one of said stub axles; and
   (b) an axle bracket connected to an inner end of the other one of said stub axles; said axle bracket connected to a second end of said spring.

10. A suspension system for a vehicle, comprising:
    (a) a pair of opposing wheels;
    (b) mounting means for separately mounting each one of said pair of wheels to said vehicle; moment transfer means for directly causing each one of said pair of wheels to maintain a spacing relative to said vehicle similar to that of the other one of said pair of wheels such that said pair of wheels act in concert; said moment transfer means connected only to said mounting means;
    (c) a moment pin for each one of said pair of wheels; each said moment pin connected to said vehicle in a generally horizontal, fore-aft orientation;
    (d) said moment transfer means comprising a spring;
    (e) an adapter connected to a first end of said spring and to an inner end of one of said stub axles;
    (f) an axle bracket connected to an inner end of the other one of said stub axles; said axle bracket connected to a second end of said spring;
    (g) a spring bracket connected to said second end of said spring; and
    (h) two pairs of links pivotally connected to said spring bracket and said axle bracket in an opposing parallelogram arrangement.

11. The suspension system according to claim 10, wherein:
    (a) said links are connected to said spring bracket and said axle bracket such that displacements of said spring bracket and said axle bracket are generally coplanar with the displacements of said stub axle connected to said axle bracket as that stub axle pivots about its respective said moment pin.

12. A suspension system for a vehicle, comprising:
(a) a pair of opposing wheels;
(b) mounting means for separately mounting each one of said pair of wheels to said vehicle; moment transfer means for directly causing each one of said pair of wheels to maintain a spacing relative to said vehicle similar to that of the other one of said pair of wheels such that said pair of wheels act in concert; said moment transfer means connected only to said mounting means;
(c) a moment pin for each one of said pair of wheels; each said moment pin connected to said vehicle in a generally horizontal, fore-aft orientation;
(d) said moment transfer means comprising a spring;
(e) an adapter connected to a first end of said spring and to an inner end of one of said stub axles;
(f) an axle bracket connected to an inner end of the other one of said stub axles; said axle bracket connected to a second end of said spring; and
(g) said axle bracket being U-shaped and having two pairs of pin guides parallelly spaced apart such that said second end of said spring is snuggly and slidably receivable therebetween.

13. The suspension system according to claim 12, wherein:
(a) said guides are oriented generally perpendicular to a plane described by said stub axle as it pivots about its respective said moment pin.

14. A suspension system for a vehicle, comprising:
(a) a pair of opposing wheels;
(b) mounting means for separately mounting each one of said pair of wheels to said vehicle;
(c) moment transfer means being a spring for directly causing each one of said pair of wheels to maintain a spacing relative to said vehicle similar to that of the other one of said pair of wheels such that said pair of wheels act in concert; said moment transfer means connected only to said mounting means;
(d) an adapter connected to a first end of said spring and to an inner end of one of said stub axles;
(e) an axle bracket connected to an inner end of the other one of said stub axles; said axle bracket connected to a second end of said spring;
(f) two pairs of roller guides parallelly spaced apart and rotatably and transversely connected to said second end of said spring; and wherein
(g) said axle bracket has a cavity such that said roller guides are snugly and slidably receivable therein.

15. The suspension system according to claim 14, wherein:
(a) said roller guides has axes oriented generally perpendicular to a plane described by said stub axle connected to said axle bracket as said stub axle pivots about its respective said moment pin.

16. A suspension system for a vehicle, comprising:
(a) a pair of opposing wheels
(b) mounting means for separately mounting each one of said pair of wheels to said vehicle; moment transfer means for directly causing each one of said pair of wheels to maintain a spacing relative to said vehicle similar to that of the other one of said pair of wheels such that said pair of wheels act in concert; said moment transfer means connected only to said mounting means;
(c) a moment pin for each one of said pair of wheels; each said moment pin connected to said vehicle in a generally horizontal, fore-aft orientation;
(d) said moment transfer means comprising a spring; and
(e) said spring including a loop.

17. An axle and suspension system for a vehicle including a pair of wheels and having a direction of travel, which comprises:
(a) axle means having opposite first and second ends each mounting one of said wheels;
(b) first and second rotational mounting means for rotatably mounting said axle means on said vehicle at first and second rotational axes, each such rotational axis extending generally parallel to said vehicle direction of travel; and
(c) spring moment transfer means for transferring a moment with respect to one of said rotational axes such that a similar but counter moment is created with respect to the other one of said rotational axes; said spring moment transfer means connected to said rotational mounting means on sides of said rotational axes opposite the wheels;
(d) said spring moment transfer means comprises said axle means having first and second stub axles at said first and second ends respectively; each said stub axle having inner and outer ends with a respective rotational axis positioned therebetween, and leaf spring means having first and second ends rigidly connected to first and second stub axle inner ends respectively; and
(e) one of said rotational mounting means including lost motion linkage means.

18. An axle and suspension system for a vehicle including a pair of wheels and having a direction of travel, which comprises:
(a) axle means having opposite first and second ends each mounting one of said wheels;
(b) first and second rotational mounting means for rotatably mounting said axle means on said vehicle at first and second rotational axes, each such rotational axis extending generally parallel to said vehicle direction of travel; and
(c) spring moment transfer means for transferring a moment with respect to one of said rotational axes such that a similar but counter moment is created with respect to the other one of said rotational axes; said spring moment transfer means connected to said rotational mounting means on sides of said rotational axes opposite the wheels;
(d) said spring moment transfer means comprises said axle means having first and second stub axles at said first and second ends respectively; each said stub axle having inner and outer ends with a respective rotational axis positioned therebetween, and leaf spring means having first and second ends rigidly connected to first and second stub axle inner ends respectively; and
(e) length adjusting means for adjusting a length of said axle means intermediate said stub axles.

19. An axle and suspension system for a vehicle including a pair of wheels and having a direction of travel, which comprises:
(a) axle means having opposite first and second ends each mounting one of said wheels;
(b) first and second rotational mounting means for rotatably mounting said axle means on said vehicle at first and second rotational axes, each such rotational axis extending generally parallel to said vehicle direction of travel;
(c) spring moment transfer means intermediate said first and second rotational mounting means for transferring a moment with respect to one of said rotational axes such that a similar but counter moment is created with respect to the other one of said rotational axes; and
(d) length adjusting means for adjusting a length of said axle means intermediate said stub axles.

* * * * *